(12) United States Patent
Choen et al.

(10) Patent No.: US 8,173,725 B2
(45) Date of Patent: May 8, 2012

(54) ASPHALT MODIFIER COMPOSITIONS WITH AN IMPROVED MELTING RATE AND MODIFIED ASPHALT PREPARED USING THE SAME

(75) Inventors: Seung-Han Choen, Daejeon (KR); Jun-sang Park, Daejeon (KR); Sunwoo Cheen, Daejeon (KR); Joonbum Pyun, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 123 days.

(21) Appl. No.: 12/681,458

(22) PCT Filed: Oct. 2, 2008

(86) PCT No.: PCT/KR2008/005806
§ 371 (c)(1),
(2), (4) Date: Apr. 2, 2010

(87) PCT Pub. No.: WO2009/045057
PCT Pub. Date: Apr. 9, 2009

(65) Prior Publication Data
US 2010/0273915 A1    Oct. 28, 2010

(51) Int. Cl.
*C08J 3/20*    (2006.01)

(52) U.S. Cl. .............................. 523/351; 524/62; 524/64
(58) Field of Classification Search .................. 523/351; 524/62, 64
See application file for complete search history.

(56) References Cited

U.S. PATENT DOCUMENTS 4,385,142 A    5/1983    Bohm et al.

FOREIGN PATENT DOCUMENTS

| EP | 0 425 025 A | | 5/1991 |
| EP | 1 203 793 A | | 5/2002 |
| WO | WO 2006/000003 A | | 1/2006 |
| WO | WO 2006/003309 | * | 1/2006 |

* cited by examiner

*Primary Examiner* — Edward Cain
(74) *Attorney, Agent, or Firm* — Frommer Lawrence & Haug LLP; Ronald R. Santucci

(57) ABSTRACT

The present invention relates to a pellet type SBS-asphalt master batch modifier composition comprising styrene-butadiene-styrene (SBS) block copolymer and asphalt, and modified asphalt prepared by melting and mixing the pellet type SBS-asphalt master batch modifier composition with asphalt. The modified asphalt prepared thereof has advantages that deterioration of physical properties and thermal oxidation can be prevented while productivity can be improved due to reduced melting time of modifier.

16 Claims, 1 Drawing Sheet

[Fig. 1]
(a)
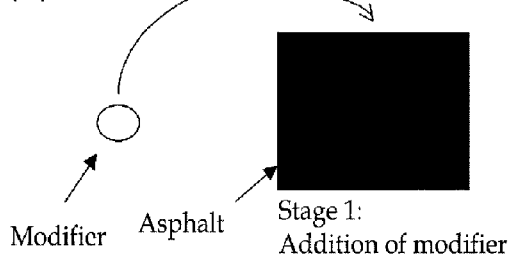
Modifier  Asphalt  Stage 1: Addition of modifier
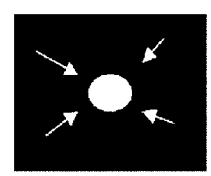
Stage 2: Mixing
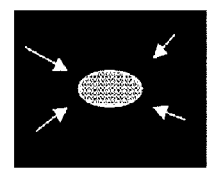
Stage 3: Penetration
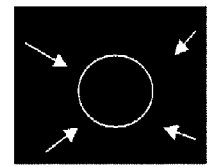
Stage 4: Swelling
(b)
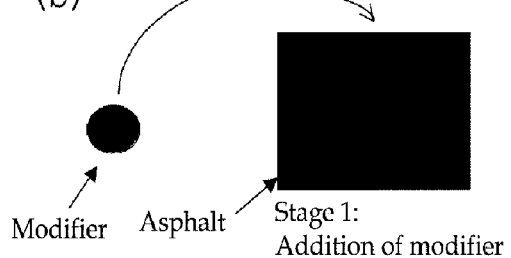
Modifier  Asphalt  Stage 1: Addition of modifier
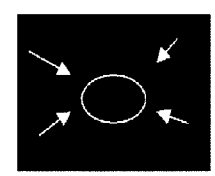
Stage 2: Mixing
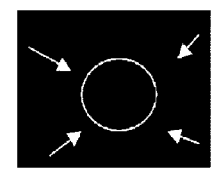
Stage 3: Swelling

US 8,173,725 B2

ASPHALT MODIFIER COMPOSITIONS WITH AN IMPROVED MELTING RATE AND MODIFIED ASPHALT PREPARED USING THE SAME

This application is a 371 of PCT/KR2008/005806 filed on Oct. 2, 2008 published on Apr. 9, 2009 under publication number WO 2009/045057 A which claims priority benefits to Korean Patent Application Number 10-2007-0099578 filed Oct. 4, 2007.

TECHNICAL FIELD

The present invention relates to a pellet type SBS-asphalt master batch modifier composition comprising styrene-butadiene-styrene (SBS) block copolymer and asphalt.

The present invention also relates to modified asphalt prepared by melting and mixing the pellet type SBS-asphalt master batch modifier composition with asphalt.

BACKGROUND ART

Asphalt is a black sticky, semi-solid material with high viscosity at room temperature. Asphalt is classified into several grades, depending on its hardness, for example, penetration, viscosity and compatibility.

Asphalt is in general graded through penetration grade test according to ASTM D946. The penetration grade is an index showing the hardness of asphalt and is determined by penetrating a standard probe into asphalt at a given temperature, specifically at 25° C., under predetermined load and time. It is measured as the depth of the probe penetrating the asphalt in 0.1 mm unit when the probe is pressed with a force of 100 g for 5 seconds. In general, the smaller the value, the harder the asphalt. There are five standard penetration grades: 40-50, 60-70, 85-100, 120-150 and 200-300. For example, the asphalt with penetration grade of 40-50 is harder than the penetration that with grade penetration grade of 200-300. The two typical types of asphalt for road pavement produced in Korea are AP-3 with penetration grade of 85-100 and AP-5 with penetration grade of 60-70.

When asphalt is exposed to a high temperature condition, it becomes viscous, thereby resulting in plastic deformation. On the contrary, when it is exposed to a low temperature condition, it becomes brittle upon external impact.

Typically, additives such as SBS block copolymer, polyolefin resin, styrene-butadiene rubber, and the like are used to reduce temperature susceptibility of asphalt. The asphalt having improved properties rendered by the addition of additives is called "modified asphalt." Among these additives, SBS block copolymer is most widely used [*J. of Materials Science*, 36, 2001, p. 451-460].

With respect to the physical properties of modified asphalt using SBS block copolymer, the melting rate of the SBS block copolymer in asphalt serves as an important factor.

The mechanism by which the SBS block copolymer is melted in asphalt is as follows [see FIG. 1(*a*)]. First, the modifier SBS block copolymer is added to asphalt at 160-200° C. (stage 1). Then, the SBS block copolymer is mixed with the asphalt (stage 2), and an aromatic oil component of the asphalt penetrates into the SBS block copolymer (stage 3). Subsequently, the SBS block copolymer swells and is dispersed in the asphalt to form a physical network (stage 4) [*J. of Materials Science* 36, 2001, p. 451-460]. From the above, it is known that the melting rate of the SBS block copolymer in the asphalt depends on how fast the SBS block copolymer becomes swollen by the asphalt component.

The asphalt modified using the SBS block copolymer is widely used as modified asphalt for road pavement, waterproof sheets, etc.

The modified asphalt for road pavement is prepared by adding and melting 3-10 weight % of a pellet or crumb type modifier (e.g., SBS block copolymer) in asphalt in a vast melting facility and mixing the modified asphalt with aggregate in an ascon plant (premix type wet method), or by adding 5-15 weight % of a modifier to asphalt when mixing the asphalt with aggregate in an ascon plant to prepare ascon (plant mix type dry method).

Of the two techniques for preparing a modified asphalt for road pavement, the premix type is more advantageous in that large-scale production is possible because the modifier is melted and mixed in asphalt at 160-200° C. in a vast melting facility, and is thus widely used for road pavement. However, in case the modified asphalt should be transported over a long distance from the melting facility to an ascon plant, the modified asphalt may experience deterioration in properties because of aging during the lengthy transport. Further, this technique is not suitable for the pavement of a short road section requiring only a small amount of modified asphalt. In addition, phase separation between the modifier and the asphalt may occur during the storage or transport.

The plant mix type is advantageous in that the phase separation problem and the deterioration of physical properties at high temperature during the manufacture and transportation may be minimized because the modifier is mixed with asphalt in an ascon plant and without the storage process. This method is widely used when the application of the premix type is difficult, for example, pavement of a short road section, pavement of a road with poor accessibility, maintenance of road, or pavement using special asphalt such as drainable asphalt. In the plant mix type, it is important that the asphalt modifier is quickly melted in the asphalt. Retardation in melting may result in retarded preparation of asphalt mixture or the modified asphalt may not exert desired property.

To solve this problem, Korean Patent Nos. 417,294 and 655,635 disclose a modifier composition for improving the melting rate of the asphalt modifier used in the plant mix type, which comprises a mixture of SBS block copolymer, adhesion-providing resin and processing aid. However, these modifiers are also limited in melting rate when high viscosity SBS block copolymer is used to prepare the composition [Korean Patent No. 701821].

Further, the cost of the adhesion-providing resin and the processing aid is very high compared to that of asphalt, and thus the cost competitiveness is behind the premix type large-scale production. In addition, oil, which is used as the main processing aid, tends to evaporate while the ascon produced in the ascon plant is transferred to the pavement site, resulting in fuming of the ascon.

The modified asphalt for waterproof sheets is prepared similarly as for the modified asphalt for road pavement premix type. 8-20 weight % of SBS block copolymer is added and melted in a mixture of asphalt and an inorganic material in a melting facility of 160-200° C. Then, the melted mixture is passed through a cloth to prepare a waterproof sheet. At this time, if the SBS block copolymer is melted slowly, the physical properties of the final product may be deteriorated due to thermal oxidation and aging caused by extended exposure to heat [*Journal of the Korean Society of Road Engineers*, Vol. 6, No. 2, 2004, p. 15-24].

In order to obtain high melting rate in the premix type technique (or modified asphalt for waterproof sheet), Korean Patent Nos. 701821 and 581,820 disclose a method of improving the melting rate by making the asphalt modifier porous using a blowing agent, thereby increasing the surface area. However, the method of using a blowing agent is disadvantageous in that foaming may occur without discontinuation during the storage or use unless the blowing agent is consumed completely in the melting process, and the byproducts formed during the foaming process may result in contamination and deteriorated physical properties of the asphalt modifier.

DISCLOSURE OF INVENTION

Technical Problem

An object of the present invention is to provide a pellet type SBS-asphalt master batch modifier composition which can significantly increase the melting rate of an asphalt modifier used in the manufacture of modified asphalt for plant mix type road pavement and waterproof sheets, thereby reducing melting time of the modifier, minimizing deterioration of physical properties caused by thermal oxidation of the modified asphalt, and enabling the use of SBS block copolymer with large weight-average molecular weight as a modifier.

Technical Solution

In an aspect, the present invention provides a pellet type SBS-asphalt master batch modifier composition comprising: 100 parts by weight of styrene-butadiene-styrene (SBS) block copolymer having a styrene content of 10-50 weight % and a weight-average molecular weight of 50,000-400,000 g/mol and 21-150 parts by weight of asphalt.

In another aspect, the present invention provides modified asphalt comprising: 70-97 weight % of asphalt and 3-30 weight % of the aforesaid pellet type SBS-asphalt master batch modifier composition.

In a further aspect, the present invention provides a method for preparing modified asphalt, comprising: mixing 100 parts by weight of SBS block copolymer, which comprises 10-50 weight % of styrene and has 50,000-400,000 g/mol of weight-average molecular weight, with 21-150 parts by weight of asphalt at 100-160° C., and processing the same to prepare a pellet type SBS-asphalt master batch modifier composition and melting and mixing 3-30 weight % of the pellet type SBS-asphalt master batch modifier composition with 70-97 weight % of asphalt at 160-200° C. to prepare the modified asphalt.

BRIEF DESCRIPTION OF THE DRAWINGS

The above and other features of the present invention will now be described in detail with reference to certain exemplary embodiments thereof illustrated in the accompanying drawing which is given hereinbelow by way of illustration only, and thus is not limitative of the present invention, and wherein:

FIG. 1 illustrates the process by which an asphalt modifier is melted and mixed in asphalt, wherein (a) illustrates the melting of a conventional modifier in asphalt, and (b) illustrates the melting of the modifier according to the present invention in asphalt.

BEST MODE FOR CARRYING OUT THE INVENTION

Hereinafter, reference will now be made in detail to various embodiments of the present invention, examples of which are illustrated in the accompanying drawing and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a pellet type SBS-asphalt master batch modifier composition comprising SBS block copolymer and asphalt, and modified asphalt comprising the pellet type SBS-asphalt master batch modifier composition.

The conventional process of preparing modified asphalt using SBS block copolymer as asphalt modifier will be described referring to FIG. 1 (a). First, the modifier SBS block copolymer modifier is added to asphalt (stage 1). Then, the modifier is melted and mixed (stage 2), and the asphalt penetrates into the SBS block copolymer (stage 3). Then, the SBS block copolymer swells and is mixed with the asphalt (stage 4). Here, the overall melting rate is greatly affected by the speed at which the asphalt penetrates into the SBS block copolymer.

FIG. 1 (b) illustrates the process of mixing SBS block copolymer and asphalt to prepare a pellet type SBS-asphalt master batch modifier composition, and melting the same in asphalt, in accordance with the present invention. First, the pellet type SBS-asphalt master batch modifier composition is added to asphalt (stage 1). Then, the master batch modifier composition is mixed and dispersed in the asphalt (stage 2). Next, the SBS block copolymer included in the master batch modifier composition swells and a physical network is formed in the asphalt (stage 3).

Comparing with the conventional modifier melting mechanism illustrated in FIG. 1 (a), the process of FIG. 1 (b) does not require the stage 3 of FIG. 1 (a) because the pellet type SBS-asphalt master batch modifier composition comprising the SBS block copolymer and the asphalt is in the state similar to the state where the penetration in the stage 3 of FIG. 1 (a) has been completed. As a result, the melting rate in asphalt can be remarkably improved when compared to those in the prior art.

The method for preparing the pellet type SBS-asphalt master batch modifier composition according to the present invention will be described in detail.

The SBS block copolymer used in the present invention is one commonly used in the art and is not particularly limited. Specifically, a linear or branched copolymer having a styrene content of 10-50 weight %, preferably 20-45 weight %, and a weight-average molecular weight of 50,000-400,000 g/mol, preferably 60,000-300,000 g/mol, may be used. When the styrene content is below 10 weight %, softening point or other physical properties may be deteriorated during asphalt modification because of insufficient elasticity. On the contrary, when the styrene content exceeds 50 weight %, the effect of asphalt modification may not be enough because of strong plasticity. When the weight-average molecular weight is smaller than 50,000 g/mol, the effect of asphalt modification may not be sufficient. On the contrary, when the weight-average molecular weight exceeds 400,000 g/mol, it will cause difficulty in melting asphalt because of extremely high viscosity and phase transition temperature.

The SBS block copolymer may be linear, branched or tapered commonly used in the art. In case of a linear block copolymer, one having a coupling efficiency (CE) of at least 50%, preferably from 60 to 100%, is preferred. When the coupling efficiency is less than 50%, elasticity is lowered due to high styrene-butadiene diblock content, thereby resulting in deterioration in softening point or other physical properties.

The branched block copolymer may be one represented by the following Chemical Formula 1:

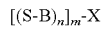 [Chemical Formula 1]

where n is an integer 1 or 2, m is an integer from 2 to 6, S is a vinyl aromatic hydrocarbon block, B is a conjugated diene block, and X is a multi-functional coupling agent.

Further, the SBS block copolymer used in the present invention may optionally comprise 5-35 weight %, preferably 6-30 weight %, of tapered block relative to the amount of the total styrene block. The introduction of the tapered block provides the advantage that phase transition occurs easily during the melting process while the physical properties of the modified asphalt are maintained and, thus, the melting rate is improved. When the content of the tapered block is less than 5 weight %, the desired effect of the addition of the tapered block may not be attained. On the contrary, when the content of the tapered block exceeds 35 weight %, softening point may decrease during the asphalt modification because the phase transition temperature becomes too low.

The asphalt included in the pellet type SBS-asphalt master batch modifier composition may be one commonly used in the art for construction or road pavement, without particular limitation.

In general, asphalt is classified into asphalt for road pavement and blown asphalt, and there are five standard penetration grades with the penetration value ranging from 0 to 300. For the asphalt for road pavement, AP-3 (penetration grade of 80-100) and AP-5 (penetration grade of 60-80) are frequently used. And, the blown asphalt refers to the asphalt having a large weight-average molecular weight prepared by blowing compressed air at high temperature of 220-250° C. to heated straight asphalt or light residual oil remaining after distillation under reduced pressure so as to induce polycondensation of the asphalt molecules. The blown asphalt may be classified into five penetration grades: 0-5, 5-10, 10-20, 20-30 and 30-40. The blown asphalt is advantageous over AP-3 or AP-5 in that the modified asphalt prepared using the SBS-asphalt master batch modifier composition is prepared comprising the same has improved softening point.

In a preferred embodiment of the present invention, the asphalt used in the preparation of the pellet type SBS-asphalt master batch modifier composition, not being limited to a certain kind, has a penetration grade of 60-100. If the penetration grade is below 60, the modified asphalt may have decreased elongation at low temperature. On the contrary, if it exceeds 100, softening point may decrease. Hence, it is preferred that the above range be maintained.

The asphalt is included in an amount of 21-150 parts by weight, preferably 35-130 parts by weight, based on 100 parts by weight of the SBS block copolymer. When the content of the asphalt is below 21 parts by weight, the improvement effect of melting rate is not apparent. On the contrary, if the content exceeds 150 parts by weight, pelletization is difficult and blocking may occur during storage after pelletization because of insufficient elasticity.

If the weight-average molecular weight of the SBS block copolymer is in the range from 50,000 to 90,000 g/mol, it is preferred that the copolymer is used in an amount of 21-120 parts by weight, preferably 35-100 parts by weight. If the amount exceeds 120 parts by weight, blocking may occur during storage after pelletization because of insufficient elasticity. On the contrary, if the weight-average molecular weight of the SBS block copolymer is in the range from 90,000 to 400,000 g/mol, it is preferred that the copolymer is used in an amount of 31-150 parts by weight, preferably 35-130 parts by weight. If the amount is less than 31 parts by weight, the improvement effect of melting rate is not significant. On the contrary, if it exceeds 150 parts by weight, blocking may occur during storage after pelletization.

During the preparation of the SBS-asphalt master batch modifier composition, an additive commonly used in the art, such as antioxidant, heat stabilizer, antistatic, lubricant, calcium carbonate, talc, styrene-butadiene rubber, etc., may be used in an amount generally known in the art.

The present invention also provides modified asphalt comprising 70-97 weight % of asphalt and 3-30 weight % of the aforesaid pellet type SBS-asphalt master batch modifier composition. If the content of the pellet type SBS-asphalt master batch modifier composition is below 3 weight %, the effect of asphalt modification is not significant. On the contrary, if the content exceeds 30 weight %, processing becomes difficult because of high viscosity. Hence, it is preferred that the above range be maintained.

The asphalt to be mixed with the pellet type SBS-asphalt master batch modifier of the present invention is an asphalt having 20-300 of penetration grade, a blown asphalt having 0-100 of penetration grade, or an asphalt comprising at least one additive selected from the group consisting of styrene-butadiene block copolymer, crumb rubber, EVA, SB-latex, tackifying resin, in order to improve its physical properties.

The pellet type SBS-asphalt master batch modifier composition of the present invention can be used for modified asphalt for waterproof sheet and plant mix type or premix type modified asphalt for road pavement. In particular, it is preferable to be used in modified asphalt waterproof sheet or and plant mix type modified asphalt for road pavement. In case the pellet type SBS-asphalt master batch modifier composition is used for modified asphalt for waterproof sheet, it is preferably included in an amount of 15-30 weight %. Meanwhile, in case the pellet type SBS-asphalt master batch modifier composition is used for modified asphalt for road pavement, a content of 3-15 weight % is preferred. As such, the content may be varied depending on the use of the modified asphalt.

The pellet type SBS-asphalt master batch modifier is prepared by mixing SBS block copolymer, asphalt and additives using a melt-mixing machine, e.g., an extruder, a kneader, a Banbury mixer, or the like, at 100-160° C., delivering the resultant strand through a die, cooling the strand using cooling water, and cutting the same using a cutter. If the temperature is below 100° C., melt-mixing may be difficult. And, if it exceeds 160° C., the process of pelletization may be difficult. Hence, it is preferred that the above range be maintained.

Preferably, the surface of thus prepared pellet type SBS-asphalt master batch modifier is treated uniformly with 0.1 part by weight of calcium stearate powder, based on 100 parts by weight of the pellet type SBS-asphalt master batch modifier, because blocking may occur in case of long term storage.

Next, the pellet type SBS-asphalt master batch modifier is melted and mixed in asphalt heated to 160-200° C. to obtain modified asphalt. If the temperature is below 160° C., melt-mixing may be difficult. And, if it exceeds 200° C., thermal aging of the modifier and the asphalt may be accelerated. Hence, it is preferred that the above range be maintained.

Thus prepared modified asphalt maintains mass loss after TFOT as measured according to ASTM D 1754 in the range from 0.01 to 0.1%.

Mode for the Invention

Hereinafter, the present invention will be described in detail referring to examples, but the present invention is not limited by the examples.

Example 1

100 parts by weight of branched SBS block copolymer (SBS-1) with 250,000 g/mol of weight-average molecular weight and 33 weight % of styrene, 50 parts by weight of asphalt (AP5) with 70 of penetration grade (25° C., 100 g, 5 sec, 0.1 mm) and 50° C. of softening point, and 0.3 part by weight of an antioxidant (tetrakis(methylene(3,5-di-t-butyl-4-hydroxyhydrocinnamic acid) were added in a Banbury mixer and mixed at 140° C. for 20 minutes. After mixing, the mixture was extruded in the form of a strand through an extruder kept at 155° C., and cooled down using a coolant and cut using a cutter to prepare a pellet type SBS-asphalt master batch modifier with about 1-2 mm of diameter.

Thus prepared asphalt modifier was melted and mixed in asphalt (AP5) having a penetration grade (25° C., 100 g, 5 sec, 0.1 mm) of 70 and a softening point of 50° C. melted by heating at 180° C. to prepare modified asphalt. Here, 12 weight % of the pellet type SBS-asphalt master batch modifier was mixed with 88 weight % of the asphalt, so that the content of the SBS block copolymer in the entire modified asphalt became 8 weight %.

Example 2

A pellet type SBS-asphalt master batch modifier was prepared in the same manner as in Example 1, except for using 100 parts by weight of asphalt (AP5) having a penetration grade (25° C., 100 g, 5 sec, 0.1 mm) of 70 and a softening point of 50° C. Then, modified asphalt was prepared in the same manner as in Example 1.

Example 3

A pellet type SBS-asphalt master batch modifier was prepared in the same manner as in Example 1, except for using 100 parts by weight of blown asphalt (BAP) having a penetration grade (25° C., 100 g, 5 sec, 0.1 mm) of 10 and a softening point of 80° C., instead of the asphalt (AP5) having a penetration grade (25° C., 100 g, 5 sec, 0.1 mm) of 70 and a softening point of 50° C. Then, modified asphalt was prepared in the same manner as in Example 1.

Example 4

A pellet type SBS-asphalt master batch modifier was prepared in the same manner as in Example 1, except for using 130 parts by weight of asphalt (AP5) having a penetration grade (25° C., 100 g, 5 sec, 0.1 mm) of 70 and a softening point of 50° C. Then, modified asphalt was prepared in the same manner as in Example 1.

Example 5

A pellet type SBS-asphalt master batch modifier was prepared in the same manner as in Example 1, except for using a linear SBS block copolymer (SBS-2) having 85,000 g/mol of weight-average molecular weight and 33 weight % of styrene content, and 40 parts by weight of asphalt (AP5) having a penetration grade (25° C., 100 g, 5 sec, 0.1 mm) of 70 and a softening point of 50° C. Then, modified asphalt was prepared in the same manner as in Example 1.

Example 6

A pellet type SBS-asphalt master batch modifier was prepared in the same manner as in Example 1, except for using a linear SBS block copolymer (SBS-2) having 85,000 g/mol of weight-average molecular weight and 33 weight % of styrene content, and 80 parts by weight of asphalt (AP5) having a penetration grade (25° C., 100 g, 5 sec, 0.1 mm) of 70 and a softening point of 50° C. Then, modified asphalt was prepared in the same manner as in Example 1.

Example 7

Modified asphalt was prepared in the same manner as in Example 1, except for mixing 18 weight % of the pellet type SBS-asphalt master batch modifier with 82 weight % of the asphalt, so that the content of the SBS block copolymer in the entire modified asphalt became 12 weight %.

Example 8

An asphalt modifier was prepared in the same manner as in Example 1, except for using 70 parts by weight of asphalt (AP5) having a penetration grade (25° C., 100 g, 5 sec, 0.1 mm) of 70 and a softening point of 50° C. Further, modified asphalt was prepared in the same manner as in Example 1, except for mixing 20.4 weight % of the pellet type SBS-asphalt master batch modifier with 79.6 weight % of the asphalt, so that the content of the SBS block copolymer in the entire modified asphalt became 12 weight %. Then, modified asphalt was prepared in the same manner as in Example 1.

Example 9

A pellet type SBS-asphalt master batch modifier was prepared in the same manner as in Example 1, except for using SBS block copolymer (SBS-3) having 90,000 g/mol of weight-average molecular weight and 35 weight % of styrene content, and 20 weight % of the total styrene block being tapered. Then, modified asphalt was prepared in the same manner as in Example 1.

Comparative Example 1

A pellet type SBS-asphalt master batch modifier was prepared in the same manner as in Example 1, except for using 20 parts by weight of asphalt (AP5) having a penetration grade (25° C., 100 g, 5 sec, 0.1 mm) of 70 and a softening point of 50° C. Then, modified asphalt was prepared in the same manner as in Example 1.

Comparative Example 2

A pellet type SBS-asphalt master batch modifier was prepared in the same manner as in Example 1, except for using 170 parts by weight of asphalt (AP5) having a penetration grade (25° C., 100 g, 5 sec, 0.1 mm) of 70 and a softening point of 50° C. Then, modified asphalt was prepared in the same manner as in Example 1.

Comparative Example 3

A pellet type SBS-asphalt master batch modifier was prepared in the same manner as in Example 1, except for using SBS block copolymer (SBS-2) having 85,000 g/mol of weight-average molecular weight and 33 weight % of styrene content, and 18 parts by weight of asphalt (AP5) having a penetration grade (25° C., 100 g, 5 sec, 0.1 mm) of 70 and a softening point of 50° C. Then, modified asphalt was prepared in the same manner as in Example 1.

Comparative Example 4

A pellet type SBS-asphalt master batch modifier was prepared in the same manner as in Example 1, except for using SBS block copolymer (SBS-2) having 85,000 g/mol of weight-average molecular weight and 33 weight % of styrene content, and 155 parts by weight of asphalt (AP5) having a penetration grade (25° C., 100 g, 5 sec, 0.1 mm) of 70 and a softening point 50° C. Then, modified asphalt was prepared in the same manner as in Example 1.

Comparative Example 5

An asphalt modifier was prepared in the same manner as in Example 1, except for putting 100 parts by weight of branched SBS block copolymer (SBS-1) having 250,000 g/mol of weight-average molecular weight and 33 weight % of styrene content, 35 parts by weight of an adhesion-providing resin ($C_9$ petroleum resin), 15 parts by weight of process oil and 0.3 part by weight of an antioxidant (methylene(3,5-di-t-butyl-4-hydroxyhydrocinnamic acid)) in a low-speed stirring mixer, mixing for 10 minutes, and melting and mixing the same at 160° C. using a twin screw extruder. Then, modified asphalt was prepared in the same manner as in Example 1.

Comparative Example 6

An asphalt modifier was prepared in the same manner as in Example 1, except for putting 100 parts by weight of branched SBS block copolymer (SBS-1) having 250,000 g/mol of weight-average molecular weight and 33 weight % of styrene content, 35 parts by weight of an asphalt (AP5) having a penetration grade (25° C., 100 g, 5 sec, 0.1 mm) of 70 and a softening point of 50° C., 15 parts by weight of white oil, 1.0 part by weight of a blowing agent (2-2-azobis(isobutyronitrile)), and 0.3 part by weight of an antioxidant (methylene(3,5-di-t-butyl-4-hydroxyhydrocinnamic acid)) in a low-speed stirring mixer, mixing for 10 minutes, and melting and mixing the same at 160° C. using a twin screw extruder. Then, modified asphalt was prepared in the same manner as in Example 1.

Comparative Example 7

Branched SBS block copolymer (SBS-1) having 1 mm of average particle size, 250,000 g/mol of weight-average molecular weight and 33 weight % of styrene content was mixed at 180° C. whit asphalt (AP5) having a penetration grade (25° C., 100 g, 5 sec, 0.1 mm) of 70 and a softening point of 50° C. Modified asphalt was prepared by mixing 12 weight % of the SBS block copolymer with 88 weight % of the asphalt.

Comparative Example 8

Branched SBS block copolymer (SBS-1) having 5 mm of average particle size, 250,000 g/mol of weight-average molecular weight and 33 weight % of styrene content was mixed at 180° C. whit asphalt (AP5) having a penetration grade (25° C., 100 g, 5 sec, 0.1 mm) of 70 and a softening point of 50° C. Modified asphalt was prepared by mixing 12 weight % of the SBS block copolymer with 88 weight % of the asphalt.

Test Example

Physical properties of the modified asphalt prepared in Examples 1-7 and Comparative Examples 1-8 were measured as follows. The result is given in Tables 1, 2 and 3 below.

[Measurement of Physical Properties]

(1) Melting time: Samples were taken in small amounts at different times while mixing the asphalt and modifier during the preparation of modified asphalt. The sample was applied thinly on a polyester sheet and was observed with naked eyes as well as under a microscope at ×100 to determine the presence of solid particles of the block copolymer. Sampling and observation were made at 5-minute intervals, after the initial 10 minutes of passage.

(2) Softening point: Softening point was measured to evaluate the extent of thermal aging of the modified asphalt or the melting rate. Even when the same modifier is mixed with asphalt at the same content, the softening point is lower if the extent of aging is higher. The softening point was measured in accordance with ASTM D 36.

(3) Mass loss after TFOT: Measured in accordance with ASTM D 1754. A large change in mass after film heating, which indicates the evaporation of volatile components, may result in fuming of ascon during transfer to the construction site.

(4) Storage stability of pellet: A 3 kg weight was placed on a pellet deposited with a dimension of 5 cm (width)×5 cm (length)×2 cm (thickness). After keeping it at 85° C. for 48 hours, the presence of blocking was observed.

TABLE 1

| | | Ex. 1 | Ex. 2 | Ex. 3 | Ex. 4 | Ex. 5 | Ex. 6 | Ex. 9 |
|---|---|---|---|---|---|---|---|---|
| | SBS-1 | 100 | 100 | 100 | 100 | — | — | |
| | SBS-2 | — | — | — | — | 100 | 100 | |
| | SBS-3 | | | | | | 100 | |
| | AP5 | 50 | 100 | — | 130 | 35 | 80 | 35 |
| | BAP | — | — | 100 | — | — | — | |
| | Storage stability of pellet | good | good | good | good | good | good | good |
| Physical | Softening point (° C.) | 96.2 | 96.1 | 99.0 | 96.1 | 90.2 | 90.1 | 89.5 |
| properties | Melting time (min) | 25 | 15 | 25 | 10 | 20 | 10 | 15 |
| of modified asphalt | Mass loss after TFOT (%) | 0.01 | 0.04 | 0.03 | 0.05 | 0.02 | 0.03 | 0.01 |

TABLE 2

|  |  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| SBS-1 | | 100 | 100 | — | — | 100 | 100 |
| SBS-2 | | — | — | 100 | 100 | — | — |
| AP5 | | 20 | 170 | 18 | 155 | — | — |
| Adhesion-providing resin | | — | — | — | — | 35 | 35 |
| Process oil | | — | — | — | — | 15 | 15 |
| Blowing agent | | — | — | — | — | — | 1.0 |
| Storage stability of pellet | | good | poor | good | poor | good | good |
| Physical properties of modified asphalt | Softening point (° C.) | 96.3 | 96.0 | 90.2 | 90.3 | 95.2 | 95.4 |
| | Melting time (min) | 60 | 10 | 55 | 10 | 70 | 40 |
| | Mass loss after TFOT (%) | 0.01 | 0.04 | 0.02 | 0.04 | 0.21 | 0.25 |

TABLE 3

|  | Ex. 7 | Ex. 8 | Comp. Ex. 7 | Comp. Ex. 8 |
|---|---|---|---|---|
| SBS-1 | 100 | 100 | 100 | 100 |
| AP5 | 50 | 70 | — | — |
| Melting time (min) | 50 | 35 | 80 | 110 |
| Softening point at completion of melting (° C.) | 130.2 | 131.3 | 128.3 | 126.2 |
| Softening point at 110 min after melting (° C.) | 126.5 | 126.3 | 126.5 | 126.2 |

As seen in Tables 1 and 2, the inventive asphalt modifiers (Examples 1-6 and 9) exhibited good melting property with the melting time within 25 minutes and showed superior storage stability as compared to that of Comparative Examples 1-6. Specifically, comparing Examples 2 and 3, in which general asphalt (AP5) and blown asphalt were used, respectively, the use of blown asphalt was effective in increasing the softening point. Comparative Examples 1-4 compare the effect depending on the asphalt content. A higher asphalt content resulted in a quicker melting time, but it resulted in poor storage stability. In contrast, lower asphalt content resulted in good storage stability, but the melting time became longer than 50 minutes.

In particular, comparing Example 1 with Comparative Examples 5 and 6, melting rate was faster by 2 times or more when asphalt was mixed in the composition (Example 1) than when adhesion-providing resin and process oil were used (Comparative Example 5). Also, the melting rate was better than when foaming was carried out to improve the surface area (Comparative Example 6). Further, Mass loss after TFOT was much lower in Example 1 than when process oil was used (Comparative Examples 5 and 6). This indicates that evaporation of volatile substances occur less during transfer.

Table 3 compares Examples 7 and 8 with Comparative Examples 7 to 8, in which the SBS-1 content in the modified asphalt was set as 12 weight %. At 110 minutes after the mixing was started, softening point was similar (126.2-126.6° C.). But, at the time when the melting was completed, softening point was higher in Examples 7 and 8, where melting time was shorter, than Comparative Examples 7 and 8. This indicates that the reduction in melting time results in the minimization of thermal aging.

The invention has been described in detail with reference to preferred embodiments thereof. However, it will be appreciated by those skilled in the art that changes may be made in these embodiments without departing from the principles and spirit of the invention, the scope of which is defined in the accompanying drawings and their equivalents.

INDUSTRIAL APPLICABILITY

In the pellet type SBS-asphalt master batch modifier composition comprising SBS block copolymer and asphalt, and the modified asphalt prepared by mixing a the pellet type SBS-asphalt master batch modifier composition with asphalt according to the present invention, the asphalt included in the modifier composition exists in the state as if it were soaked in the SBS block copolymer. As a result, the melting property of the SBS block copolymer in the asphalt is improved remarkably during the preparation of the modified asphalt, and therefore, modified asphalt with improved physical properties can produced with good productivity.

The invention claimed is:

1. A pellet type SBS-asphalt master batch modifier composition with an improved melting rate, comprising:
   100 parts by weight of styrene-butadiene-styrene (SBS) block copolymer comprising 10-50 weight % of styrene with 50,000-400,000 g/mol of weight-average molecular weight; and 21-150 parts by weight of asphalt;
   wherein the SBS block copolymer comprises 5-35 weight % of tapered styrene block relative to the amount of the total styrene block.

2. The modifier composition as set forth in claim 1, wherein the asphalt is comprised in 35-130 parts by weight.

3. The modifier composition as set forth in claim 1, which comprises:
   100 parts by weight of SBS block copolymer with 50,000-90,000 g/mol of weight-average molecular weight; and
   35-100 parts by weight of asphalt.

4. The modifier composition as set forth in claim 1, which comprises:
   100 parts by weight of SBS block copolymer with 90,000-400,000 g/mol of weight-average molecular weight; and
   35-130 parts by weight of asphalt.

5. The modifier composition as set forth in claim 1, wherein the SBS copolymer is linear, branched or tapered.

6. The modifier composition as set forth in claim 5, wherein the linear SBS block copolymer has a coupling efficiency (CE) of 50-100%.

7. The modifier composition as set forth in claim 5, wherein the branched SBS block copolymer is represented by the following Chemical Formula 1:

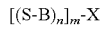

wherein n is an integer 1 or 2, m is an integer from 2 to 6, S is a vinyl aromatic hydrocarbon block, B is a conjugated diene block, and X is a multi-functional coupling agent.

8. The modifier composition as set forth in claim 1, wherein the asphalt has 60-100 of penetration grade (ASTM D946).

9. Modified asphalt comprising:
- 70-97 weight % of asphalt; and
- 3-30 weight % of the pellet type SBS-asphalt master batch modifier composition as set forth in claim 1.

10. The modified asphalt as set forth in claim 9, which has 0.01-0.1% of mass loss after TFOT.

11. The modified asphalt as set forth in claim 9, wherein said asphalt comprises an additive selected from the group consisting of styrene-butadiene block copolymer, crumb rubber, EVA, SB-latex, tackifying resin, in order to improve its physical properties.

12. A method for preparing modified asphalt, comprising:
- mixing 100 parts by weight of SBS block copolymer comprising 10-50 weight % of styrene with 50,000-400,000 g/mol of weight-average molecular weight and 21-150 parts by weight of asphalt at 100-160° C., and processing the same to prepare a pellet type SBS-asphalt master batch modifier composition; and
- melting and mixing 3-30 weight % of the pellet type SBS-asphalt master batch modifier composition with 70-97 weight % of asphalt at 160-200° C. to prepare modified asphalt;

wherein the SBS block copolymer comprises 5-35 weight % of tapered styrene block relative to the amount of the total styrene block.

13. A method for preparing modified asphalt as set forth in claim 12, wherein said asphalt comprises an additive selected from the group consisting of styrene-butadiene block copolymer, crumb rubber, EVA, SB-latex, tackifying resin, in order to improve its physical properties.

14. Modified asphalt comprising:
- 70-97 weight % of asphalt; and
- 3-30 weight % of the pellet type SBS-asphalt master batch modifier composition as set forth in claim 2.

15. Modified asphalt comprising:
- 70-97 weight % of asphalt: and
- 3-30 weight % of the pellet type SBS-asphalt master batch modifier composition as set forth in claim 3.

16. Modified asphalt comprising:
- 70-97 weight % of asphalt; and
- 3-30 weight % of the pellet type SBS-asphalt master batch modifier composition as set forth in claim 4.

\* \* \* \* \*